United States Patent [19]

Imamura

[11] 4,156,169
[45] May 22, 1979

[54] SERVO CONTROL APPARATUS
[75] Inventor: Tomoatsu Imamura, Tokyo, Japan
[73] Assignee: Ricoh Co., Ltd., Tokyo, Japan
[21] Appl. No.: 838,984
[22] Filed: Oct. 3, 1977
[30] Foreign Application Priority Data
  Oct. 3, 1976 [JP] Japan .................................. 51-18791
[51] Int. Cl.² ............................................. G05B 5/01
[52] U.S. Cl. .................................... 318/616; 318/640; 318/634
[58] Field of Search ............... 318/616, 618, 632, 634, 318/640; 250/205, 231 SE; 324/175; 356/169
[56] References Cited
  U.S. PATENT DOCUMENTS
  3,839,665  10/1974  Gabor .................................. 318/660

Primary Examiner—Robert K. Schaefer
Assistant Examiner—Eugene S. Indyk
Attorney, Agent, or Firm—David G. Alexander

[57] ABSTRACT

A sensor array produces two sinusoidal position signals which vary in phase by 90° in response to rotation of a servo motor shaft. These position signals are inverted and the position signals and their inversions are commutated to produce a velocity signal. A position error signal is generated which indicates the difference between the actual motor shaft position and the command position. A reference signal is voltage divided in accordance with the position error signal to produce a velocity command signal which is compared with the velocity signal to produce a motor drive signal. The position signals and their inversions are half wave rectified, integrated and summed to produce the reference signal as a varying D. C. signal, the magnitude of which corresponds to the amplitude of the position signals and compensates for variations in said amplitude caused by high frequency attenuation in the sensor array and like phenomenon.

10 Claims, 12 Drawing Figures

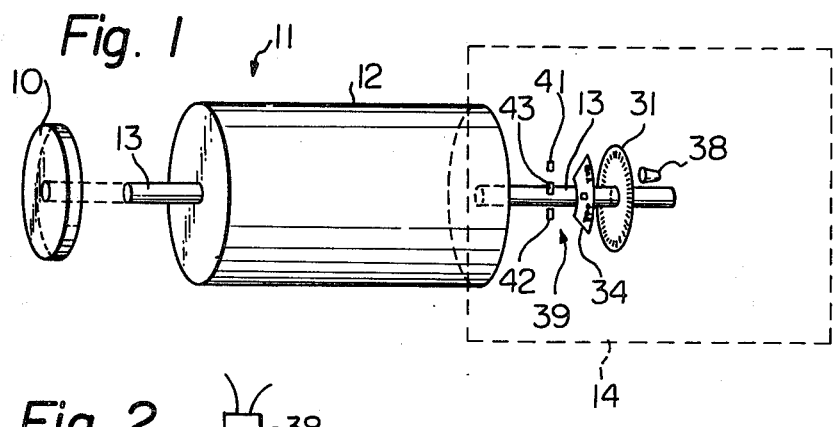
Fig. 1
Fig. 2
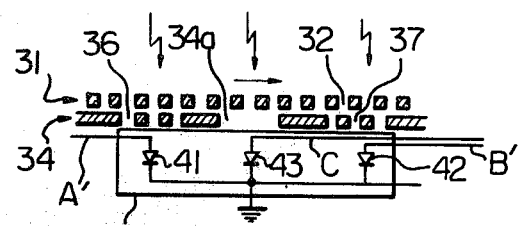
Fig. 3
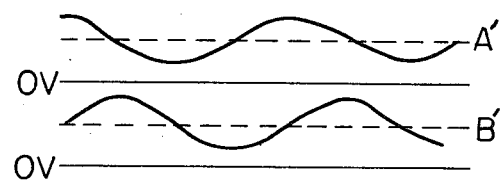
Fig. 5
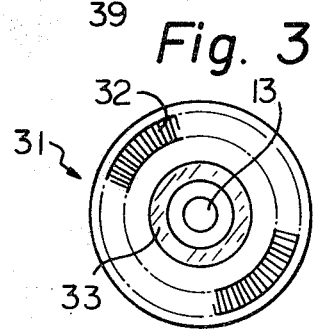
Fig. 4
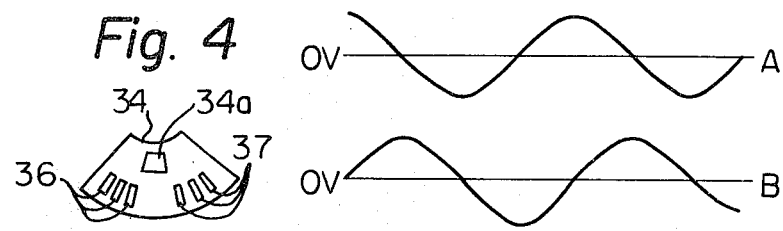

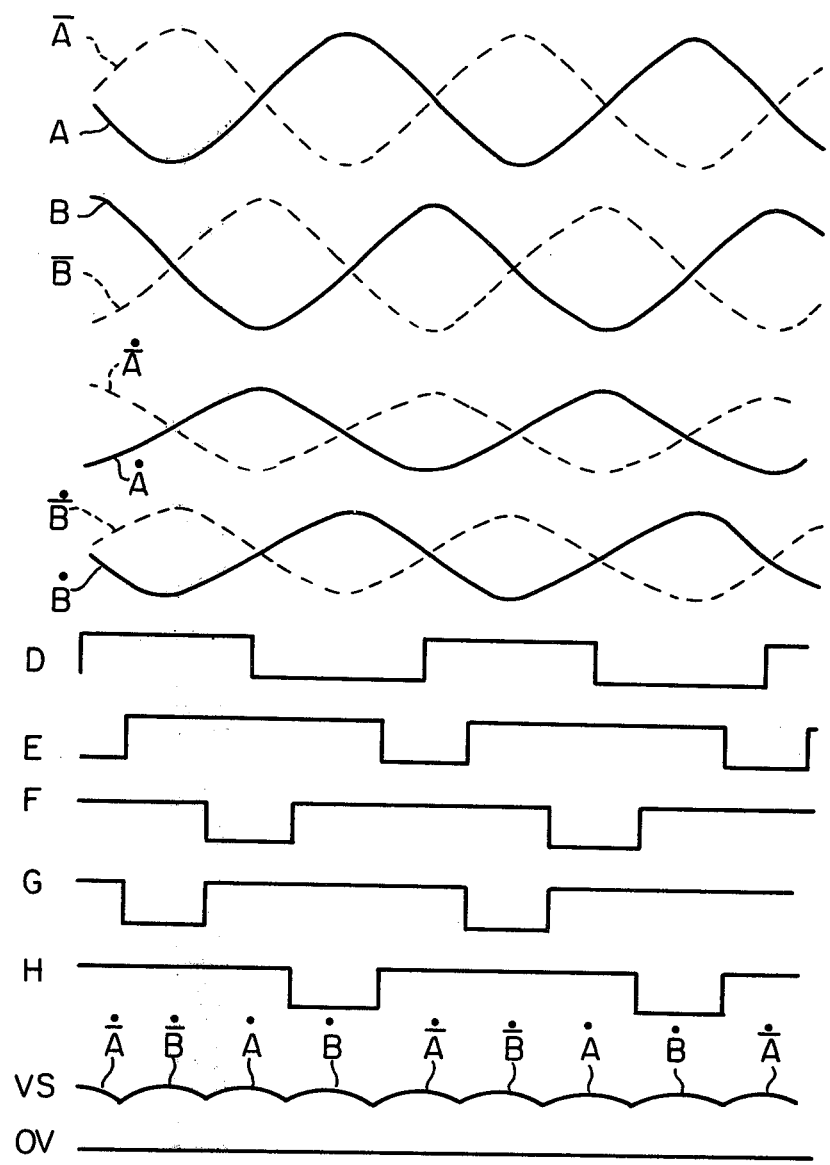

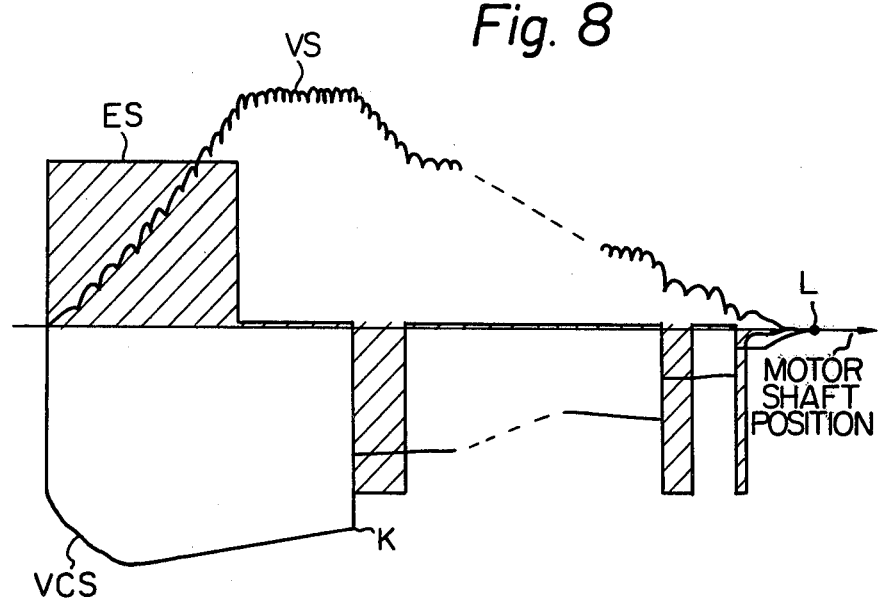
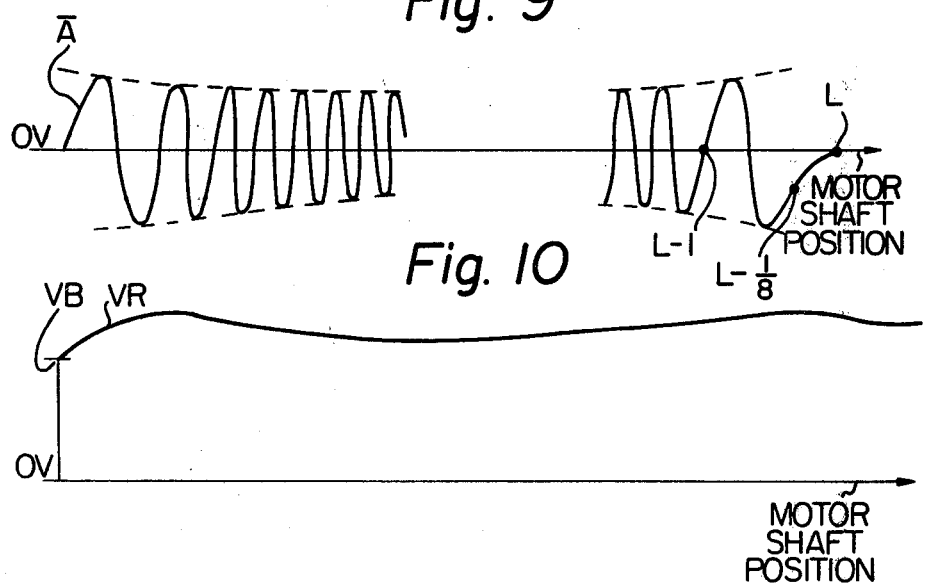

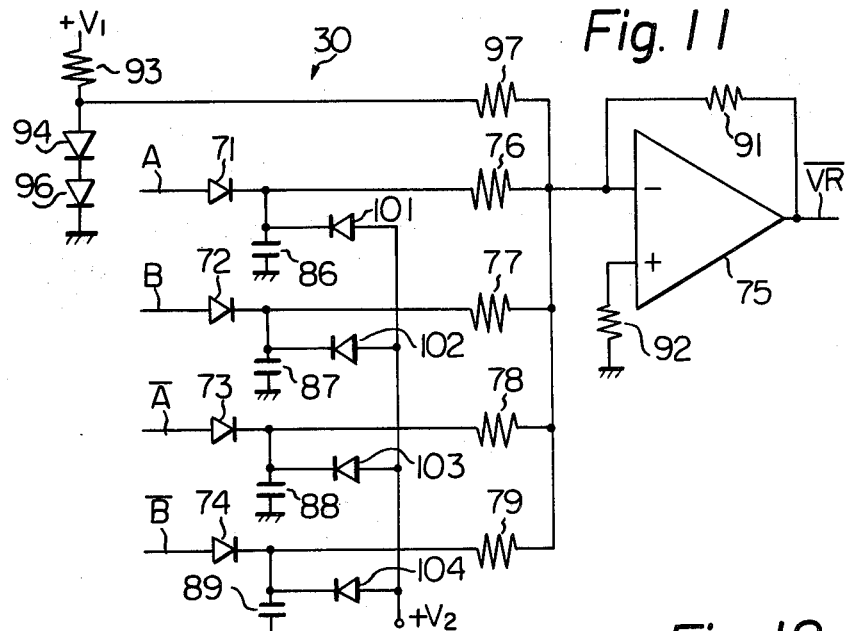
Fig. 11
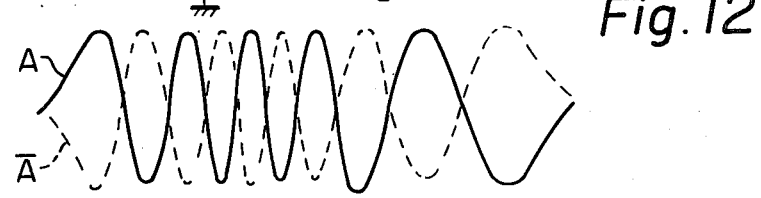
Fig. 12
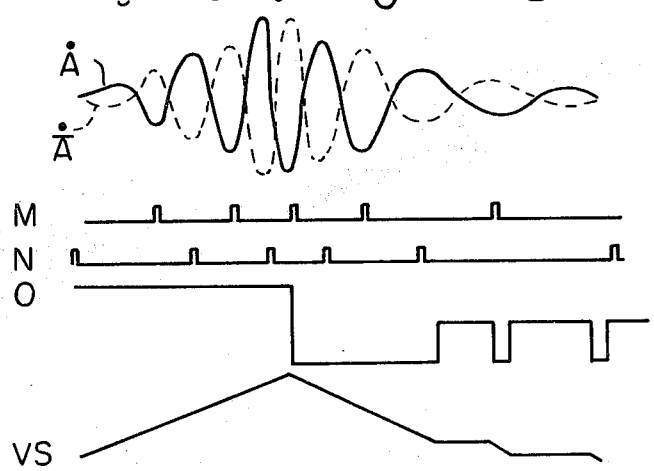

SERVO CONTROL APPARATUS

BACKGROUND OF THE INVENTION

The present invention relates to a servo control apparatus which may be advantageously incorporated into a facsimile transceiver, impact printer, magnetic disc head drive or the like.

U.S. Pat. No. 3,839,655 discloses a servo control system in which a magnetic transducer or sensor produces sinusoidal position signals in response to rotation of a servo motor shaft. These position signals are inverted, differentiated and commutated to produce an actual velocity signal which is compared with a velocity command signal to produce a motor drive signal.

A reference signal is produced by commutating the position signals and has a magnitude which is a function of the amplitude of the position signals. The reference signal is voltage divided in accordance with the distance of the motor shaft from the command position to produce the velocity command signal.

The reference signal and thereby the velocity command signal are produced in the form of ripple signals having cusps corresponding to the positive peaks of the position signals. It has been found in practice that erratic operation results due to the ripple component of the velocity command signal. It has therefore been proposed to generate the reference signal as a D.C. signal.

However, the output of the sensor array and thereby the position signals vary in amplitude due to high frequency attenuation, wow, flutter, ambient temperature variations and like factors. Thus, producing the reference signal as a constant D.C. signal introduces the problem of inaccurate speed control since the magnitude of the differentiated position signals is proportional to the motor shaft speed, and any errors in the amplitude of the position signals produce corresponding errors in the magnitude of the velocity signal.

SUMMARY OF THE INVENTION

The present invention overcomes the problems described hereinabove by rectifying, integrating and summing the position signals and inverted position signals to produce a D.C. reference signal which varies in magnitude in accordance with the amplitude of the position signals.

It is an object of the present invention to provide an improved servo control apparatus in which a major cause of erratic operation is eliminated.

It is another object of the present invention to provide an improved servo control apparatus in which a stable D.C. reference signal is produced which has a magnitude corresponding to the amplitude of position signals which are differentiated and commutated to produce a velocity signal.

It is another object of the present invention to provide a generally improved servo control apparatus.

Other objects, together with the foregoing, are attained in the embodiments described in the following description and illustrated in the accompanying drawing.

BRIEF DESCRIPTION OF THE DRAWING

FIG. 1 is a schematic view of a servo motor and sensor array of the invention;

FIG. 2 is a schematic sectional view of the sensor array;

FIG. 3 is a plan view of an occluder disc of the sensor array;

FIG. 4 is a plan view of a mask of the sensor array;

FIG. 5 is a graph illustrating position signals produced by the sensor array;

FIG. 7 is a graph illustrating the generation of a velocity signal;

FIG. 8 is a graph illustrating the operation of the servo control apparatus;

FIG. 9 is a graph illustrating a position signal as a function of time;

FIG. 10 is a graph illustrating a reference signal as a function of time;

FIG. 11 is an electrical schematic diagram of a reference signal generating means of the apparatus; and FIG. 12 is a graph illustrating an alternative method of producing the velocity signal.

DESCRIPTION OF THE PREFERRED EMBODIMENTS

Figure 6:
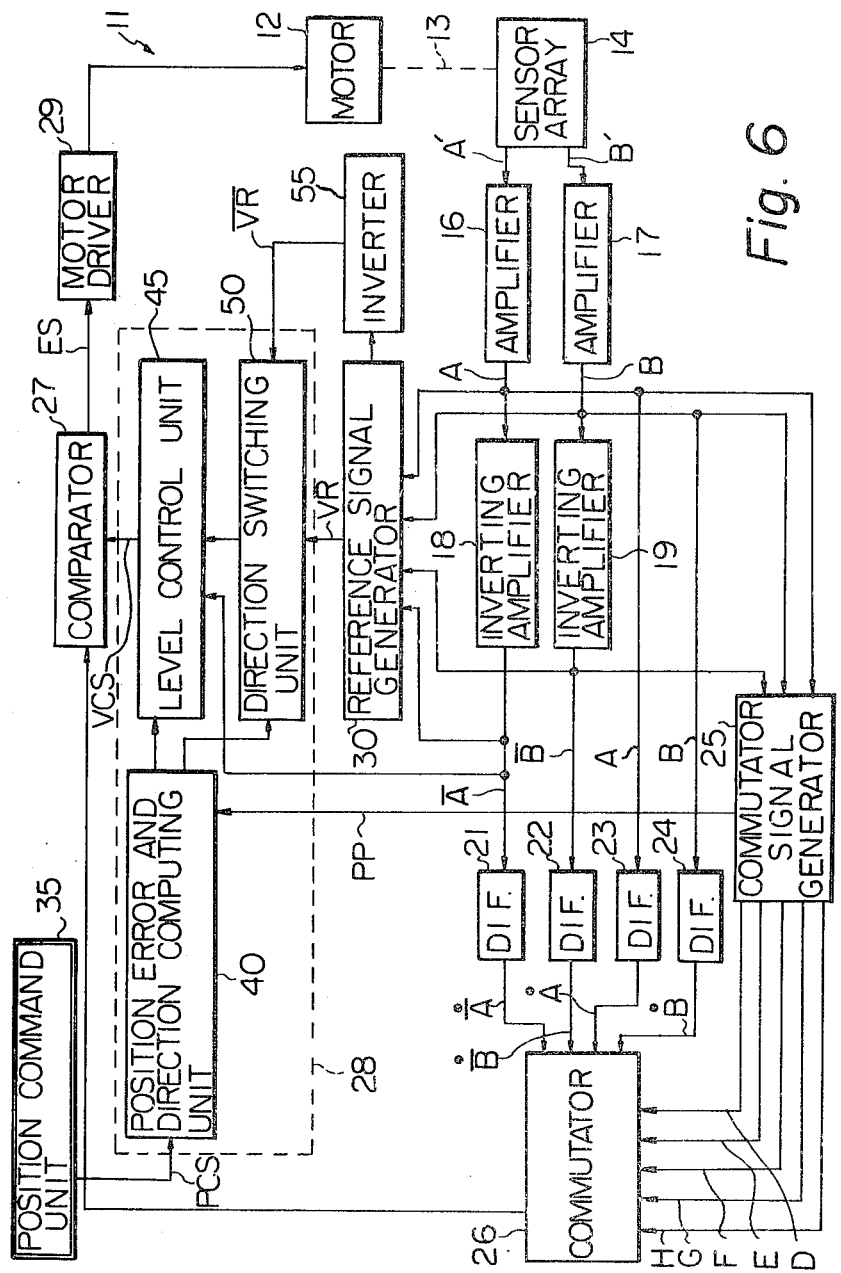
FIG. 6 is a block diagram of the servo control apparatus of the invention.

While the servo control apparatus of the invention is susceptible of numerous physical embodiments, depending upon the environment and requirements of use, substantial numbers of the herein shown and described embodiments have been made, tested and used, and all have performed in an eminently satisfactory manner.

Referring now to FIGS. 1 and 6 of the drawing, a servo control apparatus of the present invention is generally designated by the reference numeral 11 and comprises a servo motor 12. A shaft 13 of the motor 12 may be used to position a type element in an impact printer, various elements in a facsimile system, or the like, as symbolized by a load 10. The present servo apparatus 11 may be generally utilized in any type of application in which an element must be positioned by a rotary shaft.

A transducer or sensor array 14 is provided to sense the position and velocity of the shaft 13. More specifically, with reference also being made to FIG. 5, rotation of the shaft 13 causes the sensor array 14 to produce electrical position signals A' and B' which are in the form of quasisinusoidal signals superimposed on a positive D.C. level. The frequency of the position signals A' and B' is directly proportional to the speed of rotation of the shaft 13, as will be described in detail below. The position signals A' and B' are 90° out of phase relative to each other.

Amplifiers 16 and 17 amplify the position signals A' and B' respectively and remove the D.C. components to produce position signals A and B. Inverting amplifiers 18 and 19 invert the position signals A and B at an amplification factor of unity to provide inversions of the position signals A and B which are designated as $\overline{A}$ and $\overline{B}$. As is shown in FIG. 7, the position signals A, B, $\overline{A}$ and $\overline{B}$ are in quadrature; the signals B, $\overline{A}$ and $\overline{B}$ being progressively shifted in phase by 90° relative to the signal A.

The position signals $\overline{A}$, $\overline{B}$, A and B are applied to differentiators 21, 22, 23 and 24 which differentiate the same to produce differentiated position signals $\dot{\overline{A}}$, $\dot{\overline{B}}$, $\dot{A}$ and $\dot{B}$ respectively. Whereas the amplitude of the position signals A, B, $\overline{A}$ and $\overline{B}$ is independent of the velocity of the motor shaft 13 and thereby the frequency of the position signals, the amplitude of the differentiated position signals $\dot{\overline{A}}$, $\dot{\overline{B}}$, $\dot{A}$ and $\dot{B}$ increases with shaft velocity and corresponding position signal frequency. More specifically, $$(d/dt)[A(\sin \omega t)] = A\omega(\cos \omega t) \qquad (1)$$

where A is amplitude, ω is frequency of oscillation and t is time. In other words, the amplitude of the differentiated position signals $\bar{A}$, $\bar{B}$, $\dot{A}$ and $\dot{B}$ is directly proportional to the frequency of oscillation and velocity of rotation of the motor shaft 13.

The differentiated position signals $\bar{A}$, $\bar{B}$, $\dot{A}$ and $\dot{B}$ are applied to a commutator 26 which commutates the same to produce a velocity signal VS. The commutator 26 operates to sample the most positive portions of the differentiated position signals $\bar{A}$, $\bar{B}$, $\dot{A}$ and $\dot{B}$ to produce a composite signal which consists of said most positive portions. The velocity signal VS is shown in FIG. 7 as being in the form of a ripple signal having an average positive D.C. value, said average D.C. value increasing in magnitude in the positive direction in proportion to the speed of the motor shaft 13 and the frequency of the position signals. The velocity signals VS is fed to a comparator 27.

The signals A, B and $\bar{B}$ are also applied to inputs of a commutator signal generator 25, which produces and feeds to the commutator 26 commutator signals D, E, F, G and H in response thereto. These commutator signals are used to commutate the positive peaks of the differentiated position signals. More specifically, the commutator signal generator 25 comprises circuitry including Schmitt triggers and gates which are not shown in detail and are not the subject matter of the present invention. The signal D is produced by applying the signal A to an inverting Schmitt trigger with a trip point of zero volts (OV). The signal E is produced by applying the signal B to an inverting Schmitt trigger having a trip point equal to $1/\sqrt{2}$ of the peak amplitude of the signal B or shifted in phase by 45° from the sine wave peak. The signal F is produced from the signal $\bar{B}$ in the same manner as the signal E. The signal G is produced by performing a logical NAND operation on the signals D and F and the signal H is produced by performing a logical NAND operation on the signals $\bar{D}$, E and F. The speed signal VS is produced by utilizing the commutator signals D to H at their negative levels as gate signals for the differentiated position signals $\bar{A}$, $\bar{B}$, $\dot{A}$ and $\dot{B}$ in accordance with the following Boolean algebraic equations.

$$VS = \bar{A} \cdot E + \dot{A} \cdot F + \bar{B} \cdot G + \dot{B} \cdot H \qquad (1)$$

or $$VS = \bar{A} \cdot E + \dot{A} \cdot F + \bar{B} \cdot \overline{D \cdot E \cdot F} + \dot{B} \cdot \overline{\bar{D} \cdot E \cdot F} \qquad (2)$$

The commutator signal generator 25 also serves to detect the zero crossings of the inverted position signal $\bar{B}$ and produce position pulses PP inresponse thereto. The position pulses PP are fed to a computing circuit 28 in addition to a reference signal VR which is produced by a reference signal generator 30. The reference signal VR is D.C. and has a positive polarity.

Although the specific construction of the computing circuit 28 is not the subject matter of the present invention and is not shown in detail, the computing circuit 28 typically comprises a position error and direction computing unit 40 including a digital down counter (not shown). A position command signal PCS indicating a new desired command position of the motor shaft 13 is fed into the computing circuit 28 from a position command unit 35 to the unit 40 which computes the number of steps the shaft 13 must rotate to move from its initial position to the new position. This number of steps is set into the down counter. As the motor 12 is energized and the shaft 13 is rotatably driven toward the new position, the position pulses PP are fed to a down-count input of the down counter causing the same to decrement. When the down counter has decremented to zero indicating that the shaft 13 has reached the new position the motor 12 is deenergized.

The computing circuit 28 also comprises a level control unit 45 including a plurality of decoders (not shown) which decode the count in the down counter. The decoders control the switching of an attenuation network (not shown) which selectively attenuates the reference signal VR in accordance with the count in the down counter. As best illustrated in FIG. 8, the attenuation factor is increased as the motor shaft 13 approaches its new position, or as the count in the down counter decreases. The attenuated reference signal constitutes a velocity command signal VCS which is fed from the level control unit 45 to the comparator 27. It will be understood that the velocity command signal VCS decreases in magnitude as the motor shaft 13 approaches the new position so that the motor shaft 13 is initially commanded to be driven at high speed and is progressively slowed down as it approaches the new position. The unit 40 controls a direction switching unit 50 to select the reference signal VR or an inverted reference signal $\overline{VR}$ from an invertor 55 depending on the direction of the position error.

The comparator 27 compares the velocity command signal VCS from the computing circuit 28 with the actual velocity signals VS from the commutator 26 and produces an error signal ES in response to the difference therebetween. The error signal ES is amplified by a motor driver 29 and applied to the motor 12 to speed up or slow down the shaft 13 depending on the polarity of the error signal ES.

In summary, the sensor array 14 produces position signals which are utilized to produce position pulses indicating the position of the motor shaft 13, or more particularly the angular distance the motor shaft 13 has rotated. The position signals are differentiated and commutated to produce a velocity signal indicating the actual velocity of the motor shaft 13. The computing circuit 28 receives the position pulses and produces a velocity command signal indicating the velocity the motor shaft 13 should be rotating. The comparator 27 compares the velocity command signal with the actual velocity signal and controls the excitation of the motor 12 so that the shaft 13 rotates at the desired speed. The velocity command signal is gradually reduced from a high initial value to zero as the motor shaft 13 approaches the desired new position.

FIGS. 2 to 4 illustrate various main components of the sensor array 14. FIG. 3 shows an occluder disc 31 which is rotated in a unitary manner by the motor shaft 13. The disc 31 is provided with a plurality of equally circumferentially spaced light transmitting apertures 32, only one aperture 32 being labeled in the drawing for simplicity of illustration. The disc 31 is further provided with a transparent annular portion 33. The disc 31 may be formed of a circular glass plate coated with an opaque material, and the apertures 32 etched through the opaque material by any known technique.

Shown in FIG. 4 is an opaque mask 34 formed with a first series of three apertures 36 and a second series of three apertures 37 therethrough. The spacing between the apertures 36 and between the apertures 37 is the same as the spacing between the apertures 32 of the occluder disc 31.

As viewed in FIG. 2 the occluder disc 31 and the mask 34 are disposed coaxially with relation to each other with a small clearance therebetween. Whereas the disc 31 is rotated by the motor shaft 13, the mask 34 is held stationary. Where the disc 31 is rotated to a position where the apertures 36 align with the correspondingly adjacent apertures 32, the apertures 37 are out of alignment with the correspondingly adjacent apertures 32.

The sensor array 14 further comprises a light emitting diode (LED) 38 which functions as a light source and a monolithic array 39 of first, second and third photodiodes 41, 42 and 43 which function as photosensors. The LED 38 is located on the opposite side of the disc 31 and mask 34 from the array 39.

FIG. 2 shows the relative placement of the photodiodes 41, 42 and 43. The photodiodes 41 and 42 are located below the apertures 36 and 37 respectively. The photodiode 43 is located radially inwardly of the apertures 36 and 37 and is continuously illuminated by the LED 38 through the transparent annular portion 33 of the disc 31 and a transparent window 34a.

The cathodes of the photodiodes 41, 42 and 43 are grounded. The position signals A' and B' appear at the anodes of the photodiodes 41 and 42 respectively. A positive D.C. signal C appears at the anode of the photodiode 43, which is used to stabilize the sensor array 39 against variations in temperature.

Since the photodiode 43 is continuously illuminated by the LED 38, the signal C is produced continuously. However, the position signals A' and B' are produced by the photodiodes 41 and 42 respectively upon rotation of the disc 31 relative to the mask 34. In the position shown in FIG. 2, the apertures 32 and 36 align so that the photodiode 41 is uncovered and is illuminated by the LED 38. This causes the photodiodes 41 to conduct to a maximum extent and the instantaneous voltage of the position signal A' to attain a maximum positive value. Conversely, the apertures 32 and 37 are disaligned so that the photodiode 42 is covered and prevented from being illuminated by the LED 38. The conduction of the photodiode 42 is low and the instantaneous value of the position signal B' attains a minimum positive value, or approaches ground potential. Due to the arrangement of the apertures 32, 36 and 37 the photodiodes 41 and 42 produce the quasisinusoidal position signals A' and B' upon rotation of the motor shaft 13 and disc 31. As the apertures begin to align the corresponding photodiode begins to conduct until a maximum value of alignment and conduction occurs. As the apertures move out of alignment conduction decreases to a minimum value of alignment and conduction.

FIG. 8 shows the relationship between the signals VS, VCS and ES. During the initial movement of the motor shaft 13, the shaft 13 rotates at a speed lower than the command speed. VCS is maximum but the shaft 13 must accelerate so that VS is lower than VCS. The motor 12 is energized by a positive error signal ES. In the drawing of FIG. 8 the area under the curve of ES is indicated by hatching to more clearly designate it from the other curves.

When the shaft 13 reaches maximum speed ES becomes zero and the shaft 13 and load 10 are allowed to coast. At a position K before the desired command or final position L, the magnitude of the signal VCS is lowered to cause the shaft 13 to decelerate. In this case ES becomes negative and a reverse torque is applied to the shaft 13. When the shaft 13 has decelerated sufficiently, ES drops to zero and the shaft 13 again coasts. This is repeated in several steps until the shaft 13 reaches the final position L and is accurately stopped.

FIG. 9 shows the inverted position signal $\overline{A}$. This signal is utilized to stop the shaft 13 at exactly the required position. More specifically, when the shaft 13 is $\frac{1}{4}$ step before the final position, designated as L−$\frac{1}{4}$, the signal $\overline{A}$ is applied to the motor 12. This causes reverse torque to be applied to the shaft 13 which decreases to zero just at the final position L. Also designated for reference is a position L−1 which is one step before the final position L.

FIG. 10 illustrates the reference signal VR as a function of shaft position. It will be noted from a comparison of FIGS. 9 and 10 that the amplitude of the inverted position signal $\overline{A}$ decreases in correspondence with motor shaft speed VS. This is due to high frequency attenuation in the sensor array 14. It will be noted that the magnitude of the signal VR is minimum at the central portion of the curve which corresponds to maximum shaft speed. The amplitude of the signal $\overline{A}$ decreases in exactly the same manner. Thus, where the reference signal VR is voltage divided to produce the velocity command signal VCS, the signal VCS is effected in the same manner as the signal VS and errors caused by fluctuation in the output of the sensor array 14 are cancelled out.

The detailed circuitry of the reference signal generator 30 which produces the reference signal VR is illustrated in FIG. 11. The signals A, B, $\overline{A}$ and $\overline{B}$ are applied to an inverting input of an operational amplifier 75 through diodes 71, 72, 73 and 74 and summing resistors 76, 77, 78 and 79 respectively. The signals A, B, $\overline{A}$ and $\overline{B}$ are applied to the anodes of the diodes 71, 72, 73 and 74. The cathodes of the diodes 71, 72, 73 and 74 are grounded through capacitors 86, 87, 88 and 89 respectively which function as integrators.

In operation, the signals A, B, $\overline{A}$ and $\overline{B}$ are half wave rectified by the diodes 71, 72, 73 and 74 and integrated by the capacitors 86, 87, 88 and 89 respectively. More specifically, the signals A, B, $\overline{A}$ and $\overline{B}$ charge the capacitors 86, 87, 88 and 89 to an extent which is determined by the time constant of the capacitors in combination with the resistance to ground of the associated circuitry. This time constant is selected to be longer than one position signal period, preferably equal to a number of periods. The optimum time constant may be calculated or determined empirically so that the voltages across the capacitors 86, 87, 88 and 89 vary in proportion to the amplitudes of the signals A, B, $\overline{A}$ and $\overline{B}$ respectively.

The operational amplifier 75 is connected as an inverting summing amplifier and produces at its output an inversion $\overline{VR}$ of the reference signal VR. An inverter (not shown) follows the amplifier 75 to produce the signal VR.

A feedback resistor 91 is connected between the output and inverting input of the operational amplifier 75 and an offset bias compensation resistor 92 is connected between the non-inverting input of the operational amplifier 75 and ground.

The operational amplifier 75 sums the signals across the capacitors 86, 87, 88 and 89 to the signal $\overline{VR}$ as a substantially D.C. signal which is free of any ripple component or cusps which cause erratic operation in prior art apparatus. Furthermore, this summing operation minimizes the effects of variations in the amplitudes of the signals A, B, $\overline{A}$ and $\overline{B}$. In aplications where low cost is more important than accuracy, only the signals A and $\overline{A}$ or B and $\overline{B}$ may be processed to produce the reference signal VR. The decrease in accuracy is not excessive and the amount of circuitry is substantially reduced.

In order to compensate for thermal drift of the diodes described heretofore, diodes 94 and 96 are connected in series with a resistor 93 between ground and a positive D.C. source +V1. The junction of the diode 94 and resistor 93 is connected through a resistor 97 to the inverting input of the operational amplifier 75. The signal at the anode of the diode 94 is summed with the signals applied through the resistors 76, 77, 78 and 79. The diodes 94 and 96 are of the same type as the other diodes described heretofore and are connected in such a manner that variations in voltage drop as a function of temperature across the diodes 94 and 96 are applied to the operational amplifier 75 in such a manner as to cancel the variations in voltage drop across the other diodes. In other words, the diodes 94 and 96 provide temperature compensation for the circuit.

A bias voltage VB (see FIG. 10) is applied to the capacitors 86, 87, 88 and 89 from a positive D.C. source +V2 through diodes 101, 102, 103 and 104 respectively. The value of the bias voltage VB is determined by the time constant of the circuitry, and is selected to correspond to the proper value of VR when VS is zero. The effects of the amplitude of the signals A, B, $\overline{A}$ and $\overline{B}$ are in effect added to the bias voltage VB through the integrating action of the capacitors 86, 87, 88 and 89.

Thus, it will be seen that the present reference signal generator 30 produces a very precise reference voltage in the form of a varying D.C. signal which compensates for variations in the output of the sensor array 14 due to high frequency attenuation, wow, flutter, temperature variations and the like.

FIG. 12 illustrates an alternative method of forming the velocity signal VS using only the two signals A and $\overline{A}$. A Schmitt trigger or the like (not shown) produces a pulse M at every negative to positive transition of the signal $\overline{A}$. These correspond to the positive peaks of the signal A. In a similar manner, pulses N are produced at the negative to positive transitions of the signal A which correspond to the positive peaks of the signal A. These signals are integrated by a capacitor (not shown) and combined with a signal O to produce the velocity signal VS as illustrated.

Various modifications will become possible for those skilled in the art after receiving the teachings of the present disclosure without departing from the scope thereof.

What is claimed is:

1. A servo control apparatus comprising:
   a servo motor having a shaft;
   sensor means provided to the servo motor to produce position signals in response to rotation of the motor shaft;
   differentiating means for differentiating the position signals to produce a velocity signal;
   first computing means for computing and generating a position error signal;
   reference signal generating means for generating a reference signal corresponding to an amplitude of the position signals;
   second computing means for varying a magnitude of the reference signal in accordance with the position error signal to produce a velocity command signal; and
   third computing means for comparing the velocity signal and the velocity command signal and producing a motor drive signal in accordance therewith;
   the reference signal generating means comprising integrating means for integrating the position signals and summing means for summing the integrated position signals to produce the reference signal as a varying D.C. signal.

2. A servo control apparatus as in claim 1, in which the sensor means produces the position signals in the form of two generally sinusoidal signals which vary in phase relative to each other, the integrating means comprising rectifying means for rectifying the position signals.

3. A servo control apparatus as in claim 2, in which the integrating means comprises inverting means for inverting the position signals to produce two inverted position signals, the rectifying means comprising four diodes for half wave rectifying the position signals and inverted position signals respectively.

4. A servo control apparatus as in claim 3, in which the integrating means comprises four capacitors for integrating the position signals and inverted position signals respectively.

5. A servo control apparatus as in claim 2, in which the summing means comprises an operational amplifier.

6. A servo control apparatus as in claim 5, in which the summing means further comprises resistors connected to an input of the operational amplifier, the position signals being applied to the input of the operational amplifier through the resistors respectively.

7. A servo control apparatus as in claim 3, in which the summing means comprises an operational amplifier having an input and four resistors connected to the input, the position signals and inverted position signals being applied to the input through the four resistors respectively.

8. A servo control apparatus as in claim 4, in which the integrating means further comprises bias means for applying a bias voltage to the four capacitors.

9. A servo control apparatus as in claim 8, in which the bias means comprises four diodes connected between a D.C. power source and the four capacitors respectively.

10. A servo control apparatus as in claim 3, in which the integrating means further comprises temperature compensation means for the four diodes.

* * * * *